United States Patent [19]

Poirier et al.

[11] Patent Number: 4,733,750

[45] Date of Patent: Mar. 29, 1988

[54] ACOUSTIC ENCLOSURE FOR MARINE ENGINE GENERATOR SET

[75] Inventors: Randall J. Poirier; Scott J. Haugstad, both of Sheboygan; Martin W. Heinrich, Cedar Grove, all of Wis.

[73] Assignee: Kohler Co., Kohler, Wis.

[21] Appl. No.: 13,488

[22] Filed: Feb. 11, 1987

[51] Int. Cl.[4] .......................... F01N 1/10; H02K 5/24

[52] U.S. Cl. .................................... 181/202; 181/204; 181/225

[58] Field of Search ............... 181/202, 204, 205, 225, 181/277; 123/2; 290/1 B

[56] References Cited

U.S. PATENT DOCUMENTS

| | | | |
|---|---|---|---|
| 1,922,200 | 8/1933 | Frank | 181/225 X |
| 2,177,687 | 10/1939 | Bracken et al. | 209/1 A |
| 3,259,752 | 7/1966 | Honda | 290/1 R |
| 3,276,539 | 10/1966 | Dear et al. | 181/204 |
| 3,642,092 | 2/1972 | Cederbaum | 181/204 |
| 4,173,951 | 11/1979 | Ishihara | 123/2 |
| 4,174,020 | 11/1979 | Challis | 181/225 X |
| 4,197,826 | 4/1980 | Fachbach et al. | 123/198 E |
| 4,243,893 | 1/1981 | Sten | 290/1 B |
| 4,438,733 | 3/1984 | Sasaki | 123/41.62 |
| 4,493,390 | 1/1985 | Pagano et al. | 181/204 |
| 4,495,901 | 1/1985 | Nannini et al. | 123/2 |
| 4,516,657 | 5/1985 | Allard | 181/204 |
| 4,540,888 | 9/1985 | Drewry et al. | 290/1 R |
| 4,548,164 | 10/1985 | Ylonen et al. | 123/2 |
| 4,677,940 | 7/1987 | Bracht et al. | 123/2 |

FOREIGN PATENT DOCUMENTS

| | | | |
|---|---|---|---|
| 357147 | 9/1931 | United Kingdom | 181/202 |
| 2141782 | 1/1985 | United Kingdom . | |

OTHER PUBLICATIONS

"Marine Generator Set—Hush Covers and Marine Accessories", Advertising Brochure—Kohler Co., Undated.

"Sound Guard", Advertising Brochure, J. H. Westerbeke Corp., undated, received Feb. 23, 1983.

ONAN Corp—Miscellaneous Specification Sheets.

*Primary Examiner*—B. R. Fuller

*Attorney, Agent, or Firm*—Quarles & Brady

[57] ABSTRACT

An acoustical enclosure for a marine engine generator set includes a squirrel cage fan powered mechanically by the engine and mounted over a large opening in an end of the enclosure. Air inlets are provided to admit external air into the enclosure. A large air flow results, allowing the generator to be operated at full capacity, even at elevated ambient temperatures. Noise is prevented from escaping out of the opening in the end of the enclosure by having the fan placed directly over the opening, where the solid plate of the squirrel cage fan reflects a portion of the noise back into the enclosure where it is absorbed by sound absorbing material lining the inside of the enclosure. A fan duct surrounds the fan and a cover is placed over the duct. The cover is also lined with sound absorbing material to further attenuate any noise not reflected back by the fan.

4 Claims, 4 Drawing Figures

ACOUSTIC ENCLOSURE FOR MARINE ENGINE GENERATOR SET

BACKGROUND OF THE INVENTION

The field of the invention is acoustic enclosures, and more particularly, acoustic enclosures used to attenuate noise from marine engine generator sets.

Engine generator sets are often used as a source of electrical power on boats. Typically, a marine engine drives an alternator with a rating that ranges from 10 to 50 Kilowatts (KW). Enclosures are often desired for such engine generator sets to attenuate the engine noise. One common practice, as taught in U.S. Pat. No. 4,516,657 to Allard, is to reduce all external openings in the enclosure to a minimum to reduce noise leakage. However, the enclosure must also allow sufficient air flow to cool the interior components. If apertures in the enclosure are minimized, the cooling air flow can be overly restricted, necessitating that the generator be derated, e.g. operated at less than full capacity, to avoid overheating. In this regard, it is the cooling requirements for the generator, not the engine, which are the more stringent. This is especially poignant in marine applications where the engine is usually cooled by circulating sea water through a heat exchanger with the engine coolant. The engine is therefore cooled externally and the need for air flow to cool the engine is drastically reduced as compared to air cooled or radiator cooled engines. For such marine applications, the accepted practice is to enclose the engine generator set in an acoustical box with minimum ventilation, since the engine is externally cooled and maximum noise attenuation is desired. It is then necessary, however, to derate the generator accordingly due to the elevated ambient temperature inside the acoustical box. Even a small restriction in cooling for the alternator will result in some derating, as the generator is usually rated for free air operation. Therefore, the approach used in prior applications has been to oversize the generator to allow sufficient capacity for the electrical load to be served after the derating caused by the acoustic enclosure has been accounted for.

SUMMARY OF THE INVENTION

This invention is for an acoustic enclosure for a marine engine generator set. An air inlet admits external air into the enclosure. A fan is positioned over an air outlet to expel air from the enclosure, resulting in a flow of air from the inlet, through the enclosure, and out the air outlet. The fan is comprised of a "squirrel cage" type fan rotor surrounded by a fan duct to guide the fan output to the side of the enclosure. A fan duct cover encloses the fan duct and is lined with a sound absorbing material. The fan provides sufficient air flow through the enclosure to allow the generator to be operated at full capacity. Further, because the fan is positioned over the air outlet, most of the interior noise is reflected back into the enclosure. That portion of noise which is not reflected back by the fan is attenuated by the sound absorbing material on the fan duct cover.

An object of this invention is to provide an acoustic enclosure in which the air flow through the enclosure provides sufficient cooling for the generator while maintaining noise reduction properties.

A further object of this invention is to provide an acoustic enclosure in which the air flow is so great that the generator can be operated in an ambient temperature higher than that for which the generator is rated, again without compromising noise attenuating properties. The fan may be powered through a mechanical linkage to the engine, in which case a large amount of power may be delivered to the fan to generate the air flow required for operation at higher ambient temperatures.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
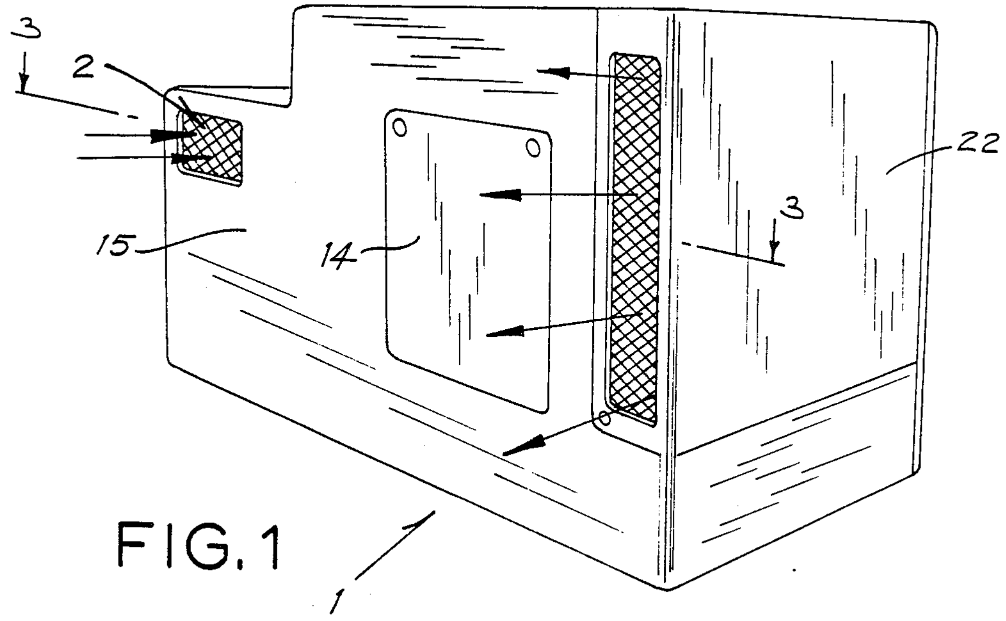
FIG. 1 is a perspective view of an acoustic enclosure according to this invention with the fan duct cover in place.
Figure 2:
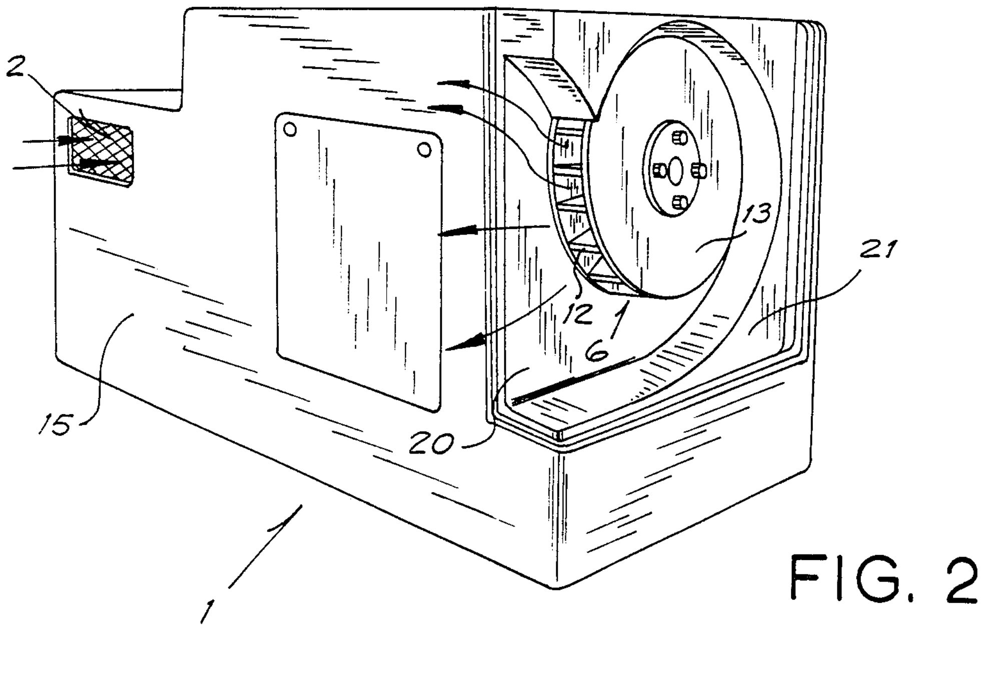
FIG. 2 is the same as FIG. 1 except with the fan duct cover removed.
Figure 3:
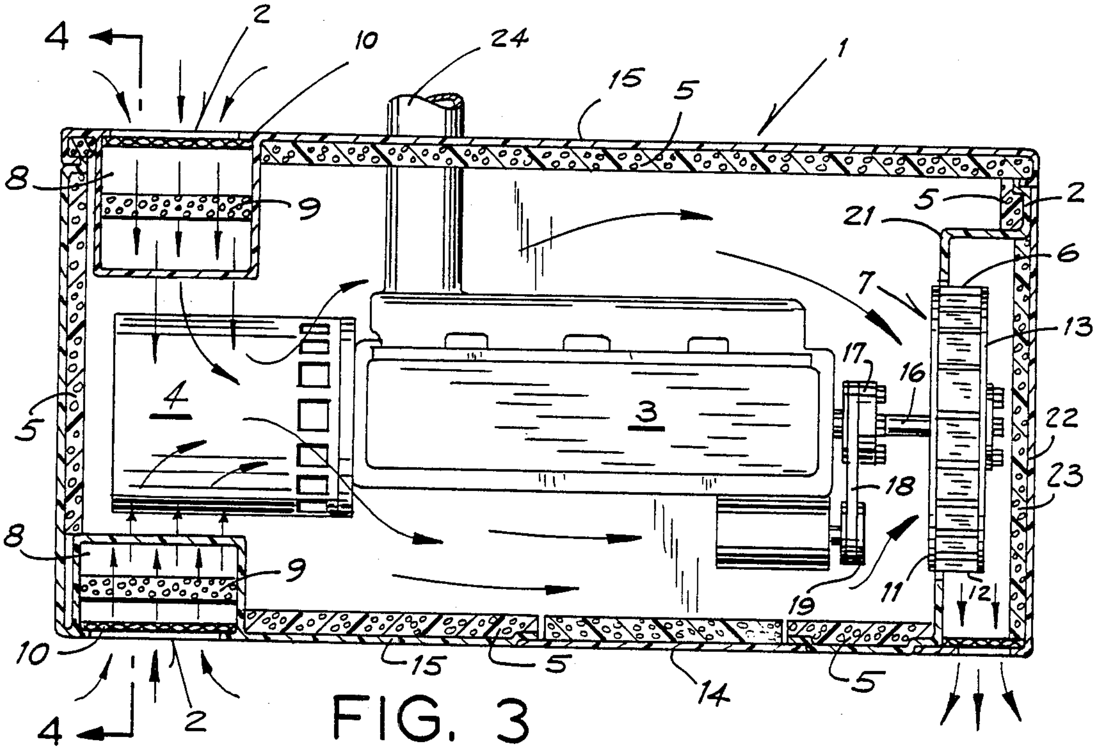
FIG. 3 is a top cut away view of the enclosure of FIG. 1 showing the engine, generator, and fan in full.
Figure 4:
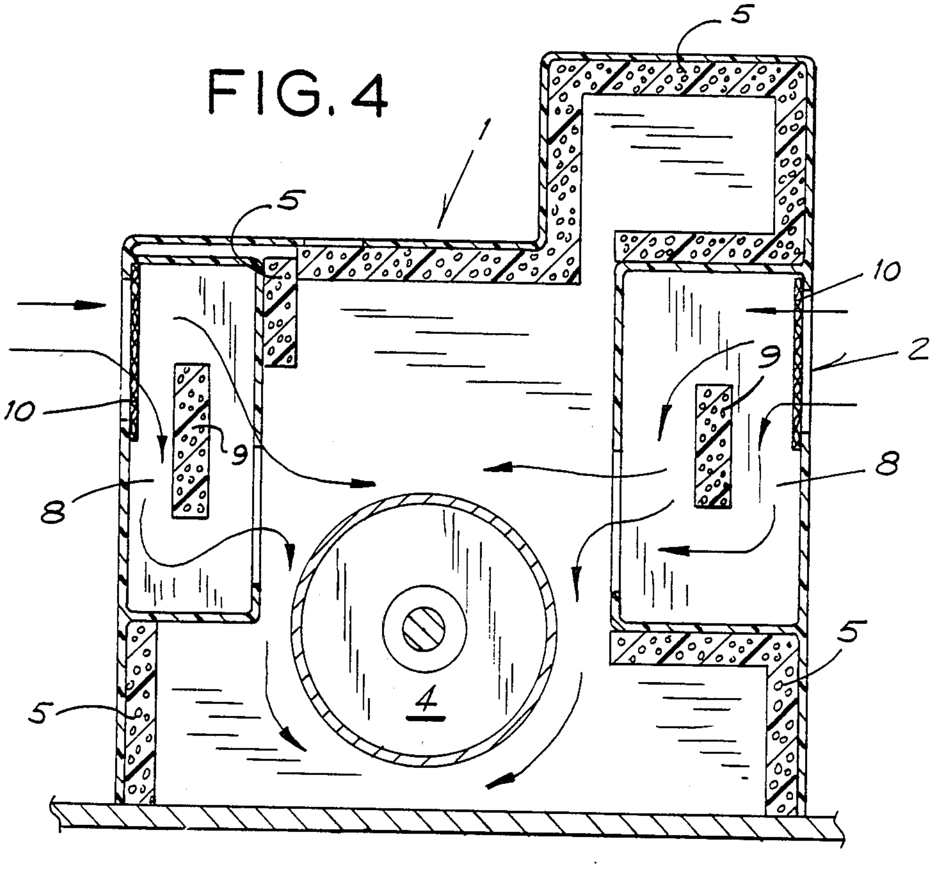
FIG. 4 is a sectional view taken along section lines 4—4 of FIG. 3.

Referring to FIGS. 1-4, an acoustical enclosure 1 for a marine engine generator set has a roughly rectangular shape and is lined on the inside with sound absorbing material 5. The engine 3 is a marine internal combustion engine which is sea water cooled. Exhaust gasses from the engine 3 are ducted out the side of the enclosure 1 and subsequently overboard through an exhaust pipe 24. The enclosure 1 includes an access panel 14 for servicing the engine 3. A generator 4 is connected on the back of the engine 3.

A pair of cooling air inlets 2 are located on each of two side walls 15 near the end of the enclosure 1 which houses the generator 4. The cooling air inlets 2 are each a small compartment 8 which includes a baffle 9 made of sound absorbing material to prevent noise from being propogated out through the inlets 2. Each inlet 2 has a grate 10 covering its opening to prevent entrance of foreign objects.

Once through the inlet 2, the cooling air first passes over the generator 4, then across the engine 3, and is then expelled out of the enclosure 1 by fan 6. In order to accommodate the large volume of air flow that is needed to adequately cool the generator 4, a very large circular opening 7 is provided in the end wall 21 of the enclosure 1 through which the fan 6 draws the cooling air out of the enclosure 1. The fan 6 is of the "squirrel cage" type and is positioned directly in the opening 7, less a small perimeter clearance. The back plate 11 of the fan 6 is just inside the enclosure 1, with the squirrel cage portion 12 and the front plate 13 passing through the opening 7 to reside primarily outside the enclosure 1. Because of the squirrel cage design for the fan 6, the cooling air is drawn in through a center hole in the back plate 11 and exhausted radially out of the squirrel cage portion 12.

The fan 6 is powered by a mechanical linkage to the engine 3. A shaft 16 is bolted onto a pulley 17 for the coolant water pump of the engine 1. The pulley 17 provides support for the shaft 16 and fan 6, and is in turn powered by a belt 18 which encircles the engine generator pulley 19 and the engine crankshaft pulley (not shown). By powering the fan 6 directly from the engine 3, a large amount of power can be delivered to the fan 6, approximately the equivalent of 500 watts. If an electric blower were used instead, that 500 watts would result in decreased generating capacity, while smaller blowers would not provide the magnitude of air flow that this invention does.

A high volume of air flow through the enclosure 1 is an important part of this invention. In fact, the cooling effect afforded by this invention is so great that the generator 4 can be operated in the enclosure 1 at an ambient temperature higher than that for which it is rated in free air. For example, the generator 4 used in this embodiment has a 20 KW rating in a free air environment of 25 degree Celsius ambient temperature. However, when operated inside the enclosure 1, the ambient temperature can be allowed to increase to 30 degrees Celsius without overheating the generator 4. This is a remarkable result, as prior enclosures to marine engine generator sets have restricted air flow to the point where derating of the generator 4 had been necessary.

Normally, an opening as large as the opening 7 would severely compromise the noise attenuation capability of the enclosure 1. However, other unique features of the ventilation system of this invention preserve, to a large extent, the noise suppression capabilities of the enclosure 1. Specifically, there are three factors incorporated by this invention which substantially reduce the amount of noise emanating from the opening 7. First, the fan 6, being a squirrel cage type, has a solid front plate 13; the only openings are radially oriented out the squirrel cage portion 12. Therefore the opening 7 is, for the most part, covered by the fan 6, and much of the noise is reflected back into the enclosure 1 where it can be absorbed by sound dampening material 5. The second factor, again because of the squirrel cage design, is that the path for the cooling air to leave the enclosure 1, and therefore the same path which sound waves must also traverse, takes a 90 degree turn going through the fan 6. There is no direct path for noise to escape the enclosure 1. Thirdly, the fan 6 is recessed in a duct 20 formed in the end wall 21 of the enclosure 1. The duct 20 is spiral shaped and flares out to an opening on the side of the enclosure 1. The duct 20 serves to increase the efficiency of the fan 6 and to define a discharge path. A cover 22 is fitted to enclose the duct 20. The inside surface of the cover 22 is lined with sound absorbing material 23 which functions to further dampen any noise that eludes the fan 6 itself.

The resulting acoustic enclosure not only quiets engine noise, but actually increases the performance of the generator 4.

We claim:

1. An enclosure for an engine generator set comprising:
   - means for absorbing sound inside the enclosure;
   - a cooling air inlet formed in a wall of the enclosure for admitting external air into the enclosure;
   - a cooling air outlet formed in a wall of the enclosure for expelling air from the interior of the enclosure;
   - fan means for drawing cooling air into the inlet through the enclosure and exhausting the air through the outlet, said fan means including:
   - a radial discharge propeller cage having an axial and which is positioned over the cooling air outlet and extends outside of the enclosure, said propeller cage being substantially radially coextensive with the cooling air outlet so as to make the cooling air outlet as large as the propeller cage and close off the outlet with the propeller cage; and
   - a plate fixed to the axial end of the propeller cage outside of the enclosure, said plate being radially continuous for at least the extent of the fan so that it is at least substantially as large as the cooling air outlet;
   - wherein the plate covers the cooling air outlet to reflect sounds coming from the enclosure through the cooling air outlet back through the outlet and back into the enclosure to be absorbed by the sound absorbing means inside the enclosure.

2. The acoustic enclosure of claim 1, wherein the enclosure wall in which the outlet is formed defines at least a portion of a duct to direct the exhausted air away from the enclosure.

3. The acoustic enclosure of claim 1, wherein a cover overlies the fan.

4. The acoustic enclosure of claim 3, wherein the cover is at least partially lined with sound insulating material.

* * * * *